(12) United States Patent
Sanu

(10) Patent No.: US 7,051,236 B2
(45) Date of Patent: May 23, 2006

(54) WIRELESSLY NETWORK-CONNECTED, BATTERY-POWERED INFORMATION HANDLING SYSTEM FEATURING PREVENTION OF DATA CORRUPTION AFTER WAKE-UP BY A NETWORK EVENT

(75) Inventor: Abiodun O. Sanu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 665 days.

(21) Appl. No.: 10/170,772

(22) Filed: Jun. 13, 2002

(65) Prior Publication Data

US 2003/0233587 A1    Dec. 18, 2003

(51) Int. Cl.
*G06F 11/00* (2006.01)

(52) U.S. Cl. ........................................ 714/22; 713/340

(58) Field of Classification Search ................. 714/22, 714/14; 713/310, 340, 323, 2
See application file for complete search history.

(56) References Cited

U.S. PATENT DOCUMENTS

| | | | | |
|---|---|---|---|---|
| 5,311,441 | A | * | 5/1994 | Tayama et al. ............... 702/63 |
| 5,442,794 | A | * | 8/1995 | Wisor et al. ................. 713/340 |
| 5,606,242 | A | | 2/1997 | Hull et al. |
| 5,958,058 | A | * | 9/1999 | Barrus ........................ 713/320 |
| 6,072,784 | A | * | 6/2000 | Agrawal et al. ............. 370/311 |
| 6,189,108 | B1 | | 2/2001 | Cromer et al. |
| 6,191,557 | B1 | | 2/2001 | Gray et al. |
| 6,266,696 | B1 | | 7/2001 | Cromer et al. |
| 6,393,570 | B1 | * | 5/2002 | Henderson et al. ......... 713/310 |
| 6,760,850 | B1 | * | 7/2004 | Atkinson et al. ........... 713/320 |
| 6,799,279 | B1 | * | 9/2004 | Okamoto et al. ........... 713/324 |
| 6,950,684 | B1 | * | 9/2005 | Goldberg .................... 455/574 |
| 2003/0097398 | A1 | * | 5/2003 | Knox et al. ................. 709/203 |
| 2003/0233587 | A1 | * | 12/2003 | Sanu ........................... 713/300 |

* cited by examiner

*Primary Examiner*—Scott Baderman
*Assistant Examiner*—Joshua Lohn
(74) *Attorney, Agent, or Firm*—Haynes and Boone, LLP

(57) ABSTRACT

A method and apparatus are provided for preventing data corruption in an information handling system when a server requests the system to perform a system management activity and the amount of battery energy remaining available to the system is not known by the requesting server. After waking up the information handling system from a sleep state, the server interrogates the system to determine the state of charge of the battery. The server considers both the remaining state of charge of the battery and the time and energy required to carry out the requested operation. If the battery has sufficient charge to carry out the particular requested operation, then the server instructs the system to carry out the particular operation. However, if the battery does not have sufficient charge to carry out the particular requested operation, then the server does not continue the requested operation or aborts the operation. In this manner, the possibility of the battery powered information handling system running out of energy during the course of an operation requested by the server and the concomitant data corruption, are substantially reduced.

24 Claims, 3 Drawing Sheets

WIRELESSLY NETWORK-CONNECTED, BATTERY-POWERED INFORMATION HANDLING SYSTEM FEATURING PREVENTION OF DATA CORRUPTION AFTER WAKE-UP BY A NETWORK EVENT

BACKGROUND

The disclosures herein relate generally to information handling systems and more particularly to networked battery-powered information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It has become commonplace for information handling systems to be networked together via local area network (LAN), wide area network (WAN) and storage area network (SAN) technologies. These connective technologies facilitate the flow of information in the home, small business, large enterprise and elsewhere. When desktop and other non-portable computers are coupled to a network, such computers generally have a permanent supply of AC power. However, to conserve power when these systems are not being used, they frequently revert to a low power sleep state until they are instructed to resume operation by a so-called "wake-up on LAN" or "wake on LAN" (WOL) event. A "wake-up on LAN" event can be an event as simple as the server commanding the sleeping computer to wake up. Other "wake-up on LAN" events can be a server computer calling the sleeping computer to wake it up to receive an operating system (OS) update, OS upgrade, application software update or upgrade or other new information. Since these systems are AC powered, they always have sufficient power to complete the task assigned after the wake-up on LAN event whether it's a brief software update or a lengthy software upgrade.

However, a battery-powered information handling system such as a portable computer coupled to the network via wireless technology may not have sufficient stored energy to complete a particular operation requested after a wake-up on LAN event. For example, an untethered portable computer may have sufficient battery power to perform a simple software update taking just a few minutes and yet have insufficient power to perform an operating system upgrade taking more than an hour. By "untethered" portable computer, it is meant that the portable computer is not physically coupled by wire to the network or an AC power source, but rather is wirelessly coupled to the network and is battery powered. Currently there is no way to be sure that an untethered portable computer will have sufficient energy to perform a particular operation after a wake-up on LAN event. Unfortunately, should a wake-up on LAN event occur and the untethered portable computer runs out of battery power during the requested operation, data corruption may result.

Therefore, what is needed is a way to prevent data corruption after a wake-up on LAN event occurs in a battery-powered information handling system wirelessly coupled to a network.

SUMMARY

Accordingly, in one embodiment an information handling system is provided wherein the information handling system includes a processor and a memory coupled to the processor. The system also includes a battery for supplying power to the system. The system further includes a wireless LAN controller, coupled to the processor, for wirelessly communicating with a network. The controller wakes up the information handling system upon occurrence of a wakeup event on the network and in response checks the state of charge of the battery and sends the state of charge to the network for a determination as to whether or not the battery has sufficient energy to execute a particular service request. If the battery is determined to have sufficient energy to execute the service request, then the information handling system executes the service request. However, if it is determined that the battery has insufficient energy to execute the service request, then execution of the service request is aborted.

A principal advantage of the embodiments disclosed herein is the prevention of data corruption in a non-tethered battery-powered networked device which is requested to perform a service request via a wireless network.

DETAILED DESCRIPTION

Figure 1:
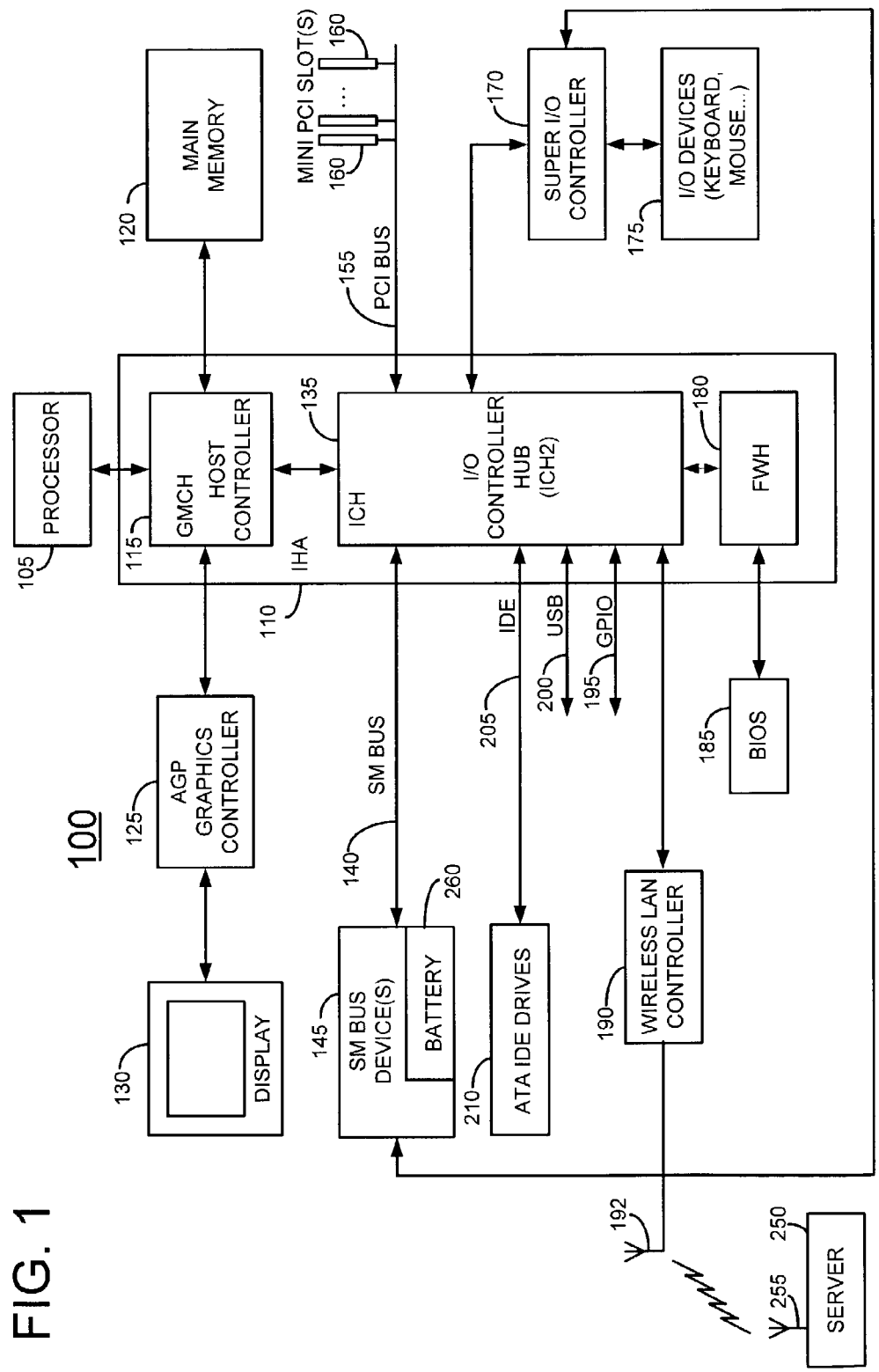
FIG. 1 is a block diagram of one embodiment of the disclosed information handling system.

FIG. 1 depicts a high level block diagram of an information handling system 100 in which the disclosed technology is practiced. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system is may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The particular information handling system 100 depicted in FIG. 1 is a portable computer which includes a processor 105. An Intel Hub Architecture (IHA) chip 110 provides system 100 with memory and I/O functions. More particularly, IHA chip 110 includes a Graphics and AGP Memory Controller Hub (GMCH) 115. GMCH 115 acts as a host controller that communicates with processor 105 and further acts as a controller for main memory 120. GMCH 115 also provides an interface to Advanced Graphics Port (AGP) controller 125 which is coupled thereto. A display 130 is coupled to AGP controller 125. IHA chip 110 further includes an I/O Controller Hub (ICH) 135 which performs numerous I/O functions. ICH 135 is coupled to a System Management Bus (SM Bus) 140 which is coupled to one or more SM Bus devices 145.

ICH 135 is coupled to a Peripheral Component Interconnect (PCI) bus 155 which is coupled to mini PCI connector slots 160 which provide expansion capability to portable computer 100. A super I/O controller 170 is coupled to ICH 135 to provide connectivity to input devices such as a keyboard and mouse 175 as shown in FIG. 1. A firmware hub (FWH) 180 is coupled to ICH 135 to provide an interface to system BIOS 185 which is coupled to FWH 180. A General Purpose I/O (GPIO) bus 195 is coupled to ICH 135. USB ports 200 are coupled to ICH 135 as shown. USB devices such as printers, scanners, joysticks, etc. can be added to the system configuration on this bus. An integrated drive electronics (IDE) bus 205 is coupled to ICH 135 to connect IDE drives 210 to the computer system.

A wireless LAN controller 190 is coupled to I/O controller hub (ICH) 135 as shown. Wireless LAN controller 190 is also coupled to an antenna 192 to enable portable computer 100 to communicate with other information handling systems on a computer network such as a remote server 250. Such wireless communication is conveniently carried out using the IEEE 802.11 wireless protocol or other wireless protocols as desired. An antenna 255 is coupled to server 250 to facilitate transmitting wireless signals to, and receiving wireless signals from, portable computers such as computer 100 and other battery powered wirelessly networked devices.

Portable computer 100 includes a battery 260 which is one of SM bus (system management bus) devices 145 residing on SM bus 140. Battery 260 is located on the super I/O branch of the SM bus as indicated by the connection of super I/O controller 170 to SM bus devices 145, of which battery 260 is one device.

Portable computer 100 is capable of operating in a reduced power state, for example a "soft off state". In this state, the power consumption of portable computer 100 is substantially reduced except for trickle or auxiliary power supplied to the wireless LAN controller 190. A sufficient portion of LAN controller 190 is powered with enough energy to enable controller 190 to respond to a request to wake up the computer. A wake-up on LAN (WOL) event transmitted wirelessly to computer 100 is an event that would wake up computer 100 from its substantially reduced power state.

Figure 2:
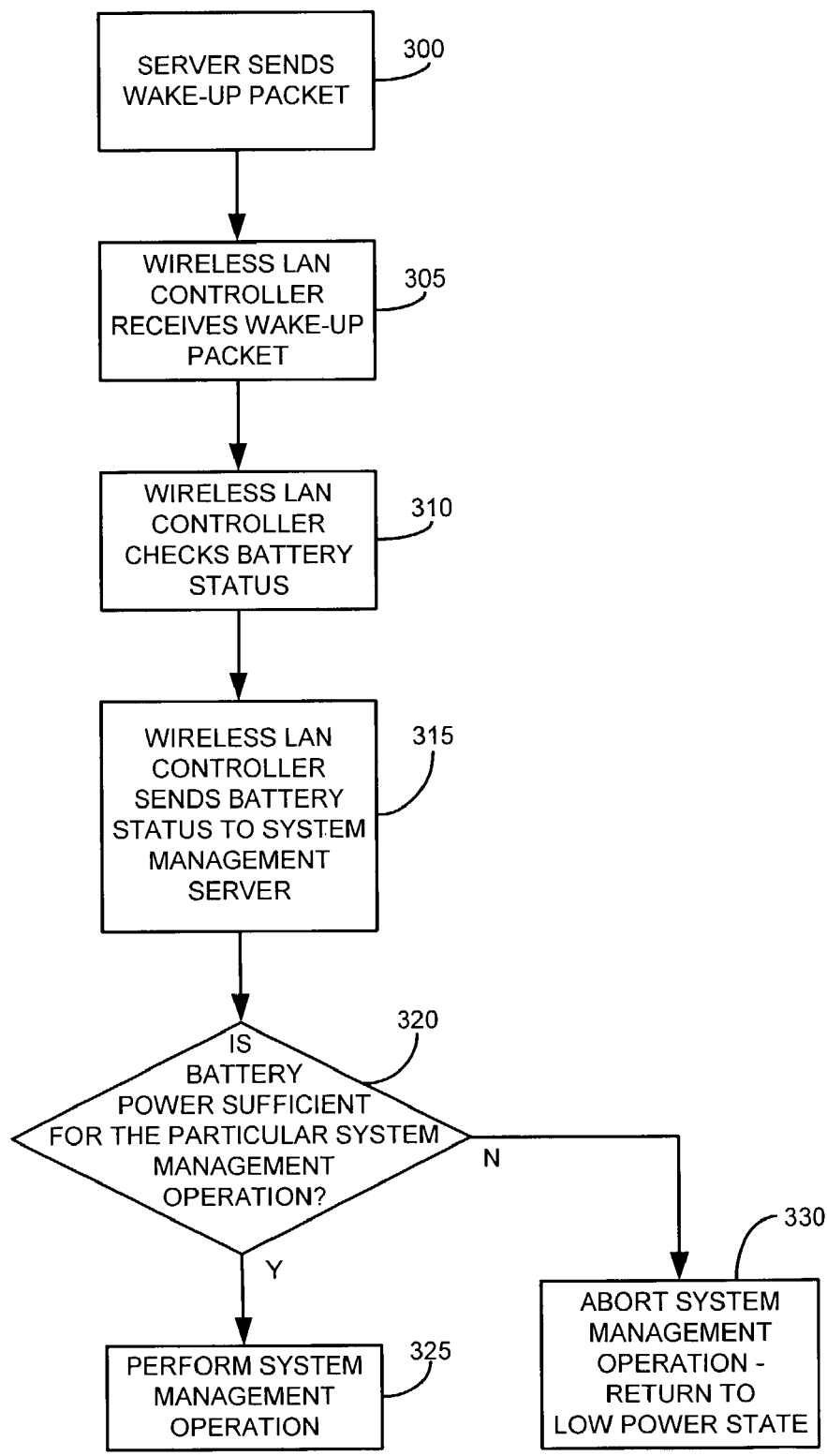
FIG. 2 is a flowchart describing the methodology employed in the operation of the information handling system of FIG. 1.

FIG. 2 is a flowchart describing the operation of portable computer 100 and server 250 in a scenario where server 250 seeks to wake up portable computer 100 to perform an activity. The requested activity could be a long duration activity such as an operating system upgrade, a medium duration activity such as an operating system update or a short duration activity such as a virus definition update or a quick application patch. Each of these activities requires a different amount of time, and hence a different amount of battery energy, to complete. If portable computer 100 runs out of battery energy while one of these requested activities is being carried out, it is possible that data on the portable computer may become corrupted. To prevent this from occurring, server 250 checks the state of charge of battery 260 to determine if it is sufficient to carry out a particular activity prior to instructing portable computer 100 to commence the particular activity. If the state of charge of battery 260 is sufficient to carry out the particular activity, then portable computer 100 is instructed to proceed and carry out the requested activity. However, if the state of charge of battery 260 is insufficient to carry out the particular activity, then the request for that activity is aborted or not sent to the portable computer 100 by server 250.

In more detail, one embodiment of the disclosed technology operates in the following manner. Assuming that portable computer 100 is in a reduced power or sleep state, server 250 sends portable computer 100 a wake-up packet as per block 300 of the flowchart of FIG. 2. This is a wake-up on LAN (WOL) event which is received by wireless LAN controller 190 as per block 305. Controller 190 then checks the state of charge of SM bus battery device 260 as per block 310. Controller 190 then sends the battery's state of charge information back to server 250 as per block 315. Server 250 is acting as a system management server in this particular example. Server 250 receives the state of charge information for battery 260 via the wireless link between portable computer 100 and server 250. Then, as per block 320, server 250 makes a determination if the battery power is sufficient to carry out the particular system management operation which is to be requested of portable computer 100. In one embodiment, server 250 makes this determination by referring to a look up table stored in the server such as Table 1 below:

TABLE 1

| OPERATION OR ACTIVITY REQUESTED | TIME REQUIRED | BATTERY CHARGE REQUIRED TO COMPLETE REQUESTED ACTIVITY (% of full charge) |
|---|---|---|
| Virus Definition File Update | 10 minutes | 5% |
| Application Patch | 30 minutes | 20% |
| Operating System Update | 1 hour | 40% |
| Operating System Upgrade | 3 hours | 95% |

For example, if server 250 is about to request that portable computer 100 perform a virus definition file update, server 250 sends a wake up packet to computer 100. Upon reading the battery state of charge information, server 250 finds that 20% of the battery's state of charge is remaining. Server 250 accesses the lookup table of Table 1 and finds that this virus update requires 5% of the battery's charge. Server 250 compares the remaining battery charge with the battery charge required to complete the activity from Table 1. In the present case, the 20% battery charge remaining is greater than the 5% charge required to complete the requested activity. Thus, there is sufficient energy in the battery to safely complete the virus update system management operation. Server 250 then moves forward and commences the virus update as per block 325 of the flowchart of FIG. 2. However, if server 250 found the state of charge of battery 260 to be only 3%, server 250 would abort the virus update system management operation and instruct portable computer 100 to return to low power state as per block 330.

It is noted that the granularity of Table 1 can be increased to store additional system—management Time Required values. For example, an application patch for program A may require 10 minutes while an application patch for program B may require 15 minutes, and an application patch for program C may require 17 minutes. All of this information is readily stored in server 250 to enable determination if battery 260 has sufficient energy to carry out a particular system management activity. Moreover, another factor in determining the "Battery Charge Required To Complete Requested Activity (% of full charge)" of Table 1 is the amount of disk access that a particular requested activity requires. Activities that require intensive disk access will require larger remaining battery charges to complete than less disk intensive activities. As the number of "Operation or Activity Requested" and time entries in Table 1 increases, as does the number of corresponding—"Battery Charge Required . . . (% of full charge)" times increase. In one embodiment of the disclosed technology, TABLE 1 need only include entries for the particular "Operation or Activity Requested" and the corresponding "Battery Charge Required . . . (% of full charge)" or other indicator of remaining battery life.

In an alternative embodiment, it is possible for portable computer 100 itself to make the determination as to whether or not it has sufficient battery power remaining to carry out a particular system management activity requested by server 250. In this instance, the look up table of Table 1 is stored in computer 100. When server 250 requests that computer 100 carry out a particular system management activity, computer 100 accesses the look up table to determine if it has sufficient battery power remaining to perform the requested activity. If computer 100 has sufficient power remaining to perform the requested activity, then computer 100 performs the requested activity. However, if computer 100 determines that it does not have sufficient power remaining to perform the activity, then the requested activity is not carried out.

Figure 3:
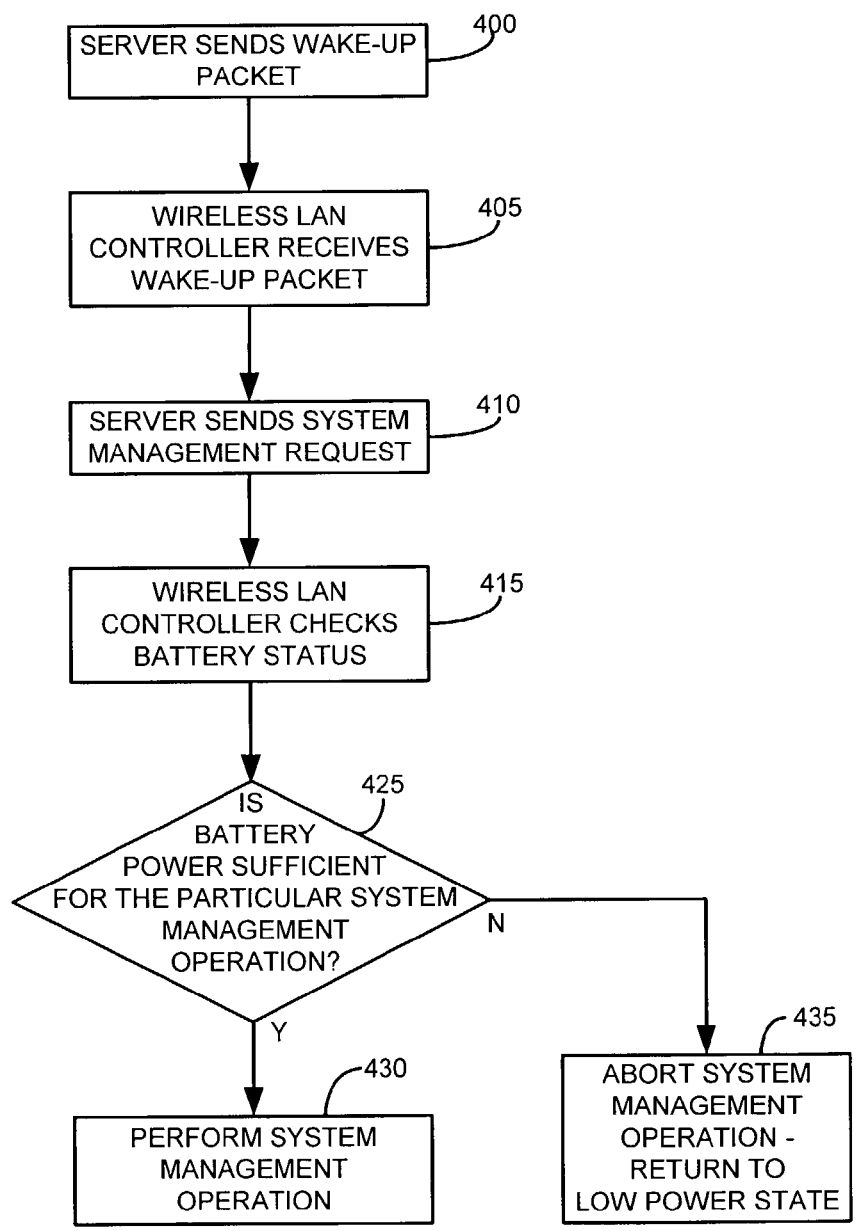
FIG. 3 is a flowchart describing an alternative methodology employed in the operation of the information handling system of FIG. 1.

In more detail, this alternative embodiment of the disclosed technology is described with reference to the flowchart of FIG. 3. Assuming for the moment that portable computer 100 is in a reduced power or sleep state, server 250 sends a wake-up packet to portable computer 100 over a wireless network as per block 400. Wireless LAN controller 190 receives the packet and wakes up as per block 405. Server 250 then sends a system management request to portable computer 100 as per block 410. Wireless LAN controller 190 then checks the state of charge of battery 260 by accessing this information over the SM bus as per block 415. In other words, portable computer 100 checks the state of charge of battery 260 by accessing this information over the SM bus as per block 415. Computer 100 then accesses the look up table (TABLE 1) to determine if the battery has sufficient remaining charge to perform the particular requested activity as per block 425. A comparison of the remaining state of charge in battery 260 with the charge required to carry out the requested activity (from TABLE 1) is employed to make this determination. While in this particular embodiment, computer 100 is described as accessing the state of charge information of battery 260 and performing the aforementioned comparison, another embodiment is contemplated wherein wireless LAN controller 190 accesses the state of charge information of battery 260 and performs the comparison.

If, after consulting TABLE 1, computer 100 determines that the state of charge of battery 260 is larger than the charge required to carry out the activity requested by server 250, then that particular activity or system management operation is performed as per block 430. However, if after comparison by computer 100 the remaining charge is found to not to be larger than the amount of charge needed to carry out the requested activity, then there is insufficient state of charge in battery 260 to safely perform the requested activity. In this case, the activity is not commenced but is aborted and a return to the low power state of computer 100 is implemented as per block 435.

In this manner, data corruption is advantageously avoided when a battery powered information handling system is requested to perform an activity via a command and/or data received over a wireless network. While untethered operation of the information handling system has been described above, the teachings herein also apply to the operational scenario wherein the portable computer is being powered by its battery and yet it is directly plugged into a network via a wire connection. In this situation where the portable computer is not connected to the AC power main, when the server requests via a wire-based network that the portable computer perform a requested activity, the portable computer will perform the battery state of charge checking already described to determine if there is sufficient energy remaining to carry out the requested activity.

The term "battery" as used herein to designate a portable energy storage device. It applies equally to other energy storage devices such as fuel cells for example.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
    a processor;
    a memory coupled to the processor;
    a battery for supplying power to the system;
    a wireless LAN controller, coupled to the processor, for wirelessly communicating with a network, the controller waking up the information handling system upon occurrence of a wakeup event on the network and in response checking the state of charge of the battery and sending the state of charge to the network for a determination as to whether or not the battery has sufficient energy to execute a particular service request; and
    a remote manager for receiving state of charge information via the wireless controller and making the determination.

2. The information handling system of claim 1 wherein the information handling system executes the particular service request if there is determined to be sufficient energy in the battery to execute the particular service request.

3. The information handling system of claim 1 wherein the information handling system aborts the particular service request if there is determined to be insufficient energy in the battery to execute the particular service request.

4. The information handling system of claim 1 wherein the particular service request is a system management request.

5. A first information handling system comprising:
    a processor;
    a memory coupled to the processor;
    a battery for supplying power to the system;
    a wireless LAN controller, coupled to the processor, for wirelessly communicating with a second information handling system connected to a network, the controller waking up the first information handling system upon occurrence of a wakeup event initiated on the network by the second information handling system and in response checking the state of charge of the battery and sending the state of charge to the second information handling system for a determination as to whether or not the battery has sufficient energy to execute a particular service request; and a remote manager for receiving state of charge information via the wireless controller and making the determination.

6. The information handling system of claim 5 wherein the first information handling system executes the particular service request if there is determined to be sufficient energy in the battery to execute the particular service request.

7. The information handling system of claim 5 wherein the first information handling system aborts the particular service request if there is determined to be insufficient energy in the battery to execute the particular service request.

8. The information handling system of claim 5 wherein the particular service request is a system management request.

9. An information handling system comprising:
a processor;
a memory coupled to the processor;
a battery for supplying power to the system;
a wireless LAN controller, coupled to the processor, for wirelessly communicating with a network, the controller waking up the information handling system upon reception of wakeup information including a particular service request, and in response the system checking the state of charge of the battery to determine if there is sufficient energy in the battery to execute the particular service request; and
a remote manager for receiving state of charge information via the wireless controller and making the determination.

10. The information handling system of claim 9 wherein the information handling system executes the particular service request if there is determined to be sufficient energy in the battery to execute the particular service request.

11. The information handling system of claim 9 wherein the information handling system aborts the particular service request if there is determined to be insufficient energy in the battery to execute the particular service request.

12. The information handling system of claim 9 wherein the particular service request is a system management request.

13. A method of operating a wirelessly networked information handling system powered by a battery, the method comprising:
entering a sleep state by the information handling system;
monitoring, by the information handling system, for a wake-up event;
waking up, by the information handling system, upon occurrence of a wake-up event providing a service request;
monitoring the state of charge of the battery in the information handling system; and
providing a remote manager for receiving the state of charge information via a wireless signal and determining if the state of charge of the battery is sufficient to execute the service request.

14. The method of claim 13 further comprising:
executing the service request if the state of charge of the battery is determined to be sufficient to execute the service request.

15. The method of claim 13 further comprising:
aborting the service request if the state of charge of the battery is determined to be insufficient to execute the service request.

16. The method of claim 13 wherein the particular service request is a system management request.

17. A method of operating a first information handling system powered by a battery, the system being configured to wirelessly communicate over a network to a remote second information handling system, the method comprising:
entering, by the first information handling system, a sleep state;
receiving, by the first information handling system, wakeup information from the network;
monitoring, by the first information handling system, the state of charge of the battery;
sending, by the first information handling system, the state of charge over the network to the second information handling system; and
the second information handling system receiving the state of charge information and determining, if the state of charge of the battery is sufficient to perform a particular service request.

18. The method of claim 17 further comprising:
executing, by the first information handling system, the particular service request if the state of charge of the battery is determined to be sufficient to execute the particular service request.

19. The method of claim 17 further comprising:
aborting, by the first information handling system, the particular service request if the state of charge of the battery is determined to be insufficient to execute the particular service request.

20. The method of claim 17 wherein the particular service request is a system management request.

21. A method of operating a first information handling system powered by a battery, the first information handling system being configured to wirelessly communicate over a network to a remote second information handling system, the method comprising:
entering, by the first information handling system, a sleep state;
receiving from the network, by the first information handling system, wakeup information including a particular service request;
waking up, by the first information handling system, in response to receiving the wakeup information;
monitoring, by the first information handling system, the state of charge of the battery; and
the second information handling system receiving the state of charge information and determining, if the state of charge of the battery is sufficient to execute the particular service request.

22. The method of claim 21 further comprising:
executing, by the first information handling system, the particular service request if the state of charge of the battery is determined to be sufficient to execute the particular service request.

23. The method of claim 21 further comprising:
aborting, by the first information handling system, the particular service request if the state of charge of the battery is determined to be insufficient to execute the particular service request.

24. The method of claim 21 wherein the particular service request is a system management request.

* * * * *